US007557962B2

(12) United States Patent
Herron

(10) Patent No.: US 7,557,962 B2
(45) Date of Patent: Jul. 7, 2009

(54) SYSTEM AND METHOD FOR TONE-DEPENDENT MULTI-FREQUENCY HALFTONE SCREENING

(75) Inventor: Stephen K. Herron, Ladera Ranch, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 689 days.

(21) Appl. No.: 10/890,333

(22) Filed: Jul. 13, 2004

(65) Prior Publication Data

US 2006/0012829 A1    Jan. 19, 2006

(51) Int. Cl.
*H04N 1/40* (2006.01)
*H04N 1/405* (2006.01)
*G06K 15/00* (2006.01)

(52) U.S. Cl. .................. 358/3.06; 358/1.2; 358/1.9; 358/2.99; 358/3.01; 358/3.02; 358/3.09; 358/3.1; 358/3.12; 358/3.13; 358/3.14; 358/3.17; 358/3.2; 358/3.21; 358/3.23; 358/532; 358/534; 358/535; 358/536

(58) Field of Classification Search ............... 358/3.04, 358/3.06, 3.07, 3.08, 3.1, 3.19, 3.2, 3.23, 358/3.26, 3.13, 534, 535, 536, 1.2, 3.01, 358/3.11, 3.12; 382/298, 299, 300; 708/290, 708/313, 847

See application file for complete search history.

(56) References Cited

U.S. PATENT DOCUMENTS

| | | | | |
|---|---|---|---|---|
| 5,073,966 A | * | 12/1991 | Sato | 382/237 |
| 5,166,809 A | * | 11/1992 | Surbrook | 358/1.9 |
| 5,283,140 A | * | 2/1994 | Netz et al. | 430/6 |
| 5,291,311 A | * | 3/1994 | Miller | 358/3.23 |
| 5,543,935 A | * | 8/1996 | Harrington | 358/3.07 |
| 5,696,604 A | * | 12/1997 | Curry | 358/3.02 |
| 5,740,279 A | * | 4/1998 | Wang et al. | 382/237 |
| 5,760,922 A | * | 6/1998 | Kojima | 358/464 |
| 5,766,807 A | * | 6/1998 | Delabastita et al. | 430/6 |
| 5,774,236 A | * | 6/1998 | Blazey | 358/3.14 |
| 6,104,502 A | * | 8/2000 | Shiomi | 358/1.9 |
| 6,118,935 A | | 9/2000 | Samworth | |
| 6,538,677 B1 | * | 3/2003 | Thompson et al. | 347/131 |
| 6,538,771 B1 | * | 3/2003 | Sakatani et al. | 358/2.1 |
| 6,606,168 B1 | | 8/2003 | Rylander | |
| 6,760,126 B1 | * | 7/2004 | Kritayakirana et al. | 358/2.1 |
| 6,783,203 B2 | * | 8/2004 | Fujimori | 347/15 |
| 7,262,879 B2 | * | 8/2007 | Chang | 358/1.9 |
| 2002/0196469 A1 | | 12/2002 | Yao | |
| 2003/0189728 A1 | | 10/2003 | Jung | |
| 2003/0210431 A1 | | 11/2003 | Rylander | |
| 2004/0051907 A1 | | 3/2004 | Huang et al. | |

* cited by examiner

*Primary Examiner*—King Y Poon
*Assistant Examiner*—Richard Z Zhu
(74) *Attorney, Agent, or Firm*—Tucker Ellis & West LLP

(57) ABSTRACT

The present invention is directed to a system and method for halftone screening. A system for halftone screening includes means adapted to receive image data having a desired number of tonal levels representative of a continuous tone image and means adapted to compress the received image data from a desired number of tonal levels to image data having a lesser number of tonal levels. The system further includes a memory including a look-up table, the look-up table including each of the lesser number of tonal levels and an array containing screen frequency data for each of the lesser number of tonal levels. The system still further includes means adapted for communicating the image data containing each of the lesser number of tonal levels to the look-up table, whereby corresponding screen frequency data is output therefrom.

18 Claims, 5 Drawing Sheets

SYSTEM AND METHOD FOR TONE-DEPENDENT MULTI-FREQUENCY HALFTONE SCREENING

BACKGROUND OF THE INVENTION

The present invention relates generally to halftone screening processes and, more particularly, to a system and method for a tone-dependent multi-frequency halftone screen.

Halftone screening processes function to transform a continuous tone image into a binary image that is to be rendered and perceived by an observer as an original continuous tone image. Halftone screening processes typically apply a halftone screens to a continuous tone image. The result is binary image that appears to be made up of patterns or groups of individual black or white printer device dots. Each pattern or group has a proportion and arrangement of black and white dots so as to render, from a distance, an impression of a selected level of gray. Thus, when a halftone image is observed from a typical viewing distance, it appears as an original, continuous tone image. Currently, halftone screening processes are used in printing and display devices such as laser printers, dot matrix printers, inkjet printers; and the like.

Halftoning is necessary because many output devices are not capable of producing all of the shades or colors often contained in continuous tone images. For example, a laser printer may have only one color of ink; typically, black. There are no grays. Halftoning permits the appearance of a number of shades of gray.

Halftone screens are defined by screen frequencies, typically measured in lines per unit of length, such as lines per inch (lpi). Thus, screen frequency is often represented by a grid. Each square in the grid then represents a halftone cell capable of holding a halftone dot pattern. Higher screen frequencies produce finer halftone screens, while lower screen frequencies produce coarser halftone screens. Further, multiple screen frequencies are represented by multiple grid or halftone screens.

To convert a continuous tone image into a halftone image, a halftone screen or grid is typically superimposed on the continuous tone image. Each halftone cell in the halftone screen or grid is then assigned a different sized dot to represent the continuous tone image data for that halftone cell. Again, when all of the dots are viewed together at a normal viewing distance, the dots appear as the original continuous tone image.

The size of the halftone cells is determined by the interaction of the selected screen frequency with a printer's device resolution. The word "printer" refers to any mechanism known in the art suitably capable of making marks on a physical substrate. A- printer creates an electronic version of the halftone screen, while screening software r applies a selected dot pattern to the electronic image. The image recorder resolution setting reflects the image recorder's ability to place device dots close together. For example, a device dot is created by an image recorder laser beam when it is focused on a point on a print drum. When the halftone image is printed, the area on the piece of paper corresponding to the area exposed to the laser beam is black. The closer together the laser can place the dots and the smaller the dot diameter, the higher the halftone resolution. Thus, groups of device dots composing the grid are commonly referred to as "printer dots," and further, printer device resolution is measured in device dots per inch (dpi), and is represented by a grid.

When the halftone grid is laid over the resolution grid, each halftone cell is filled with device dots. Groups of device dots form halftone dots. Thus, each of the halftone cells in the previous example is comprised of many device dots that are created by the printer's laser, forming the halftone dots. Each of these device dots created by the image recorder is selectively turned on, producing a final output, e.g., gray scale, or turned off, producing no output or white.

The group of device dots within a halftone cell produces a halftone dot of a specific size and shape. For example, if the halftone dot needs to be bigger, the printer's laser turns on more device dots. Similarly, if the halftone dot needs to be smaller, the printer's laser turns on fewer device dots. To create different shapes, the printer's laser turns the device dots on in different sequences. Each sequence is determined by a mathematical equation referred to as a spot function or, more commonly, by a sequence of numbers referred to as a threshold array. Different spot functions and array sequences exist for each dot shape. Common shapes include round, diamond, square and elliptical.

Halftone names can be confusing. For example, there are two types of square-shaped halftones. In one of these, the halftone dots are shaped like squares all the way through the tint or grey scale. In the other, the halftone dots start out shaped like circles, grow to square shapes in the mid-tones, and then become circular again. In addition, for example, different manufacturers of printing devices use different spot functions to create halftone dots. Thus, not every manufacturer's round or square dots, for example, grow in exactly the same way.

One print standard, commonly referred to as PostScript Adobe Systems, has emerged which includes a system for handling gray levels. PostScript requires at least 256 levels of grey to properly reproduce a continuous tone image. Because of this requirement, manufacturers have adopted 256 grey levels as a de facto standard.

Generally, it is desirable to increase the screen frequency and to increase the number of tone levels to provide a halftone image that more closely resembles the original continuous tone image. However, there is a trade-off between higher screen frequencies and the number of tone levels. Higher screen frequencies, by virtue of containing more halftone cells, produce finer screens that can capture more detail of the original continuous tone image. Therefore, because the resolution remains constant, the more halftone cells there are, the fewer device dots each halftone cell can contain. Furthermore, as the number of device dots within each halftone cell decreases, so does the number of tone levels each halftone cell can reproduce.

Thus, there exists a need for a system and method that provides increased resolution while also providing an increase in the number of tonal levels.

SUMMARY OF THE PRESENT INVENTION

The present invention provides increased resolution while also providing an increase in the number of tonal levels. The invention is directed to a system and method for halftone screening. More particularly, the present invention is directed to a tone-dependent multi-frequency halftone screen.

In accordance with the present invention, there is provided a system for halftone screening. The system comprises means adapted to receive image data having a desired number of tonal levels representative of a continuous tone image. The system advantageously includes a memory including a lookup table, the lookup table including an array containing halftone data for a range of tonal levels. The system teaches means adapted for communicating the image data containing each tonal level to the look-up table, whereby corresponding screen frequency data is output therefrom.

In a preferred embodiment, the system further comprises means adapted to compress the received image data from a desired number of tonal levels to image data having a lesser number of tonal levels, wherein the look-up table includes each of the lesser number of tonal levels, and wherein the look-up table includes an array containing halftone data for each of the lesser number of tonal levels.

Further, in accordance with the present invention, there is provided a method of halftone screening. The method comprises receiving image data having a desired number of tonal levels representative of a continuous tone image. The method further includes generating a lookup table, wherein the lookup table itself includes an array containing halftone data for a range of tonal levels. The system also teaches communicating the image data containing the tonal levels to the look-up table, whereby corresponding halftone data is output therefrom.

In one embodiment, the method further includes the step of compressing the received image data from a desired number of tonal levels to image data having a lesser number of tonal levels, wherein the look-up table includes each of the lesser number of tonal levels, and wherein the look-up table includes an array containing halftone data for each of the lesser number of tonal levels.

Additional advantages and novel features of the invention will be set forth in part in the description which follows, and in part will become apparent to those skilled in the art upon examination of the following or may be learned by practice of the invention. Such advantages of the invention may be realized and attained by various structures and methods as covered by the patent claims and the equivalents thereto.

BRIEF DESCRIPTION OF THE DRAWINGS

The accompanying figures incorporated in and forming a part of the specification, illustrate several aspects of the present invention, and together with the description serve to explain the principles of the invention. In the figures.

DETAILED DESCRIPTION OF PREFERRED AND ALTERNATE EMBODIMENTS

The present invention is directed to a system and method for halftone screening. As used herein, the term halftone screening refers to processes used to transform a continuous tone image into a binary image that may be rendered and perceived by an observer as the original continuous tone image. Halftone screening is suitable in visual output rendering devices or printing devices such as, for example, laser printers, offset presses and inkjet printers.

Figure 1A:
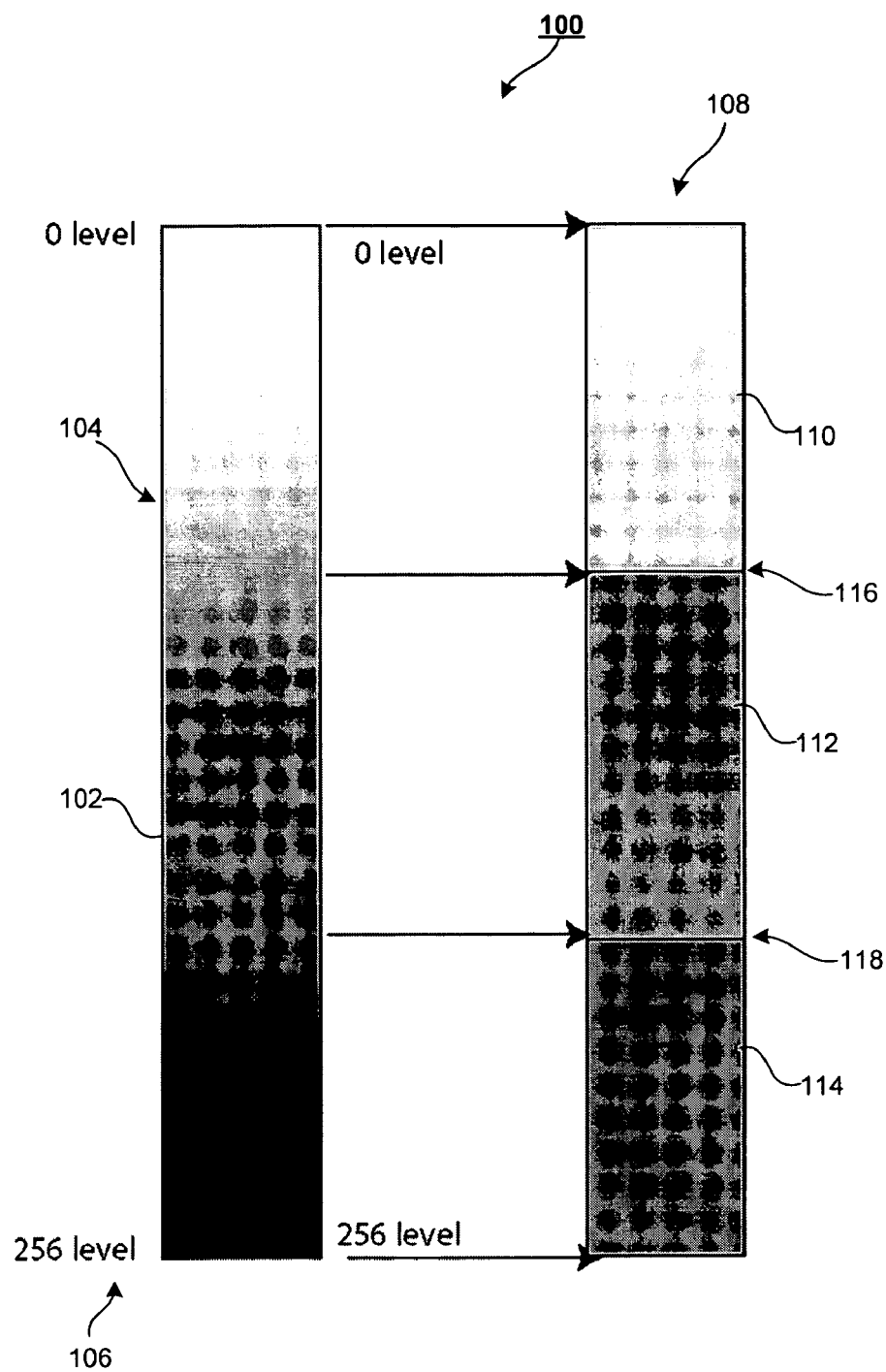
FIG. 1A is an illustration of the mapping of gray levels to screen frequencies in accordance with principles of the present invention.

Turning to FIG. 1A, there is presented an illustration of the mapping of gray levels to screen frequencies in accordance with principles of the present invention. More specifically, FIG. 1A illustrates a process 100 of mapping grey levels to screen frequencies from left to right. Beginning on the left most portion of FIG. 1A, image data 102 having a desired number of tonal levels 104 representative of a continuous tone image is received. Since most images are described with a maximum of 256 tonal levels, suitably in accordance with the de facto PostScript standard, 256 desired tonal levels 16 are used for the embodiment in FIG. 1A. However, those of ordinary skill in the art will appreciate that differing numbers of desired tonal levels are advantageously used without departing from the spirit of the present invention. Further, those of ordinary skill in the art will also appreciate that the present invention is not limited to gray levels or gray scales but is equally applicable to color processes as well.

The image data 102 is then adjusted until the tonal levels 106 are visually linear. A one-dimensional linearization curve is used to adjust the tonal levels 106 until a visually linear gradient is achieved. An illustration of such a gradient will be shown and described in more detail in conjunction with FIG. 3.

Referring to the right most portion of FIG. 1A, the image data 102 is converted to one-bit halftone threshold arrays. More specifically, a range of tonal levels are related to the appropriate array resulting in an image described in one-bit dots, a halftone being the result. The example shows image tonal levels divided into thirds, with each third relating to a different halftone screen. The middle screen of a higher frequency than the upper and lower portions of the image's gray levels. The screen for the upper third gray levels is advantageously different from the screen for the lower third levels.

While real-time or near real-time realizations of this are suitably implemented, a lookup table is advantageously used for this conversion. The lookup table includes an array containing screen frequency data 108 for each of the tonal levels 104. Such a lookup table will be described in more detail in conjunction with FIG. 4.

Typically, a PostScript halftone uses either a spot function or an array of numbers describing the build pattern and the shape of a halftone dot within each cell formed by a particular screen frequency. In contrast, the present invention describes a concatenation of three arrays. Further, a spot function can consist of a number of functions describing various dot shapes. The arrays 108 describe in a non-formula way the shape and growth of the dots with each cell.

For example, still referring to FIG. 1A, a first tone area 110 of the three arrays 108 describes cells having one halftone frequency, while a second tone area 112 describes cells having another halftone frequency. Further, a third tone area 114 of the arrays 108 describes cells having yet another halftone frequency.

It will be understood by those skilled in the art that in a preferred embodiment, the subject invention is advantageously employed in conjunction with a compression of the tonal scale prior to applying the halftone. For example, with reference to FIG. 1B, there is shown the process 150 of mapping grey levels to screen frequencies from left to right in accordance with principles of the present invention. The skilled artisan will appreciate that the compression of the tonal scale occurs before a halftone is applied. The process 150 begins with the compression of the image data 152 with a number of tonal levels 154, e.g., 256 levels 156, to image data 158 with a lesser number of tonal levels 160, as illustrated in the centermost portion of FIG. 1B. Continuing with the present example, a lesser number of 169 tonal levels 162 are used.

Compressing the image data from 256 tonal levels 156 to 169 tonal levels 162 results in a compression ratio of 170/256, or approximately 0.664. In such compression, every third desired tonal level 154 is eliminated or every three desired tonal levels 154 are quantified to two lesser tonal levels 160. Once the compression is complete, the image data 158 is adjusted until the tonal levels 162 are visually linear. As referenced above and discussed below with reference to FIG. 3, a one-dimensional linearization curve is used to adjust the tonal levels 162 until a visually linear gradient is achieved.

Figure 1B:
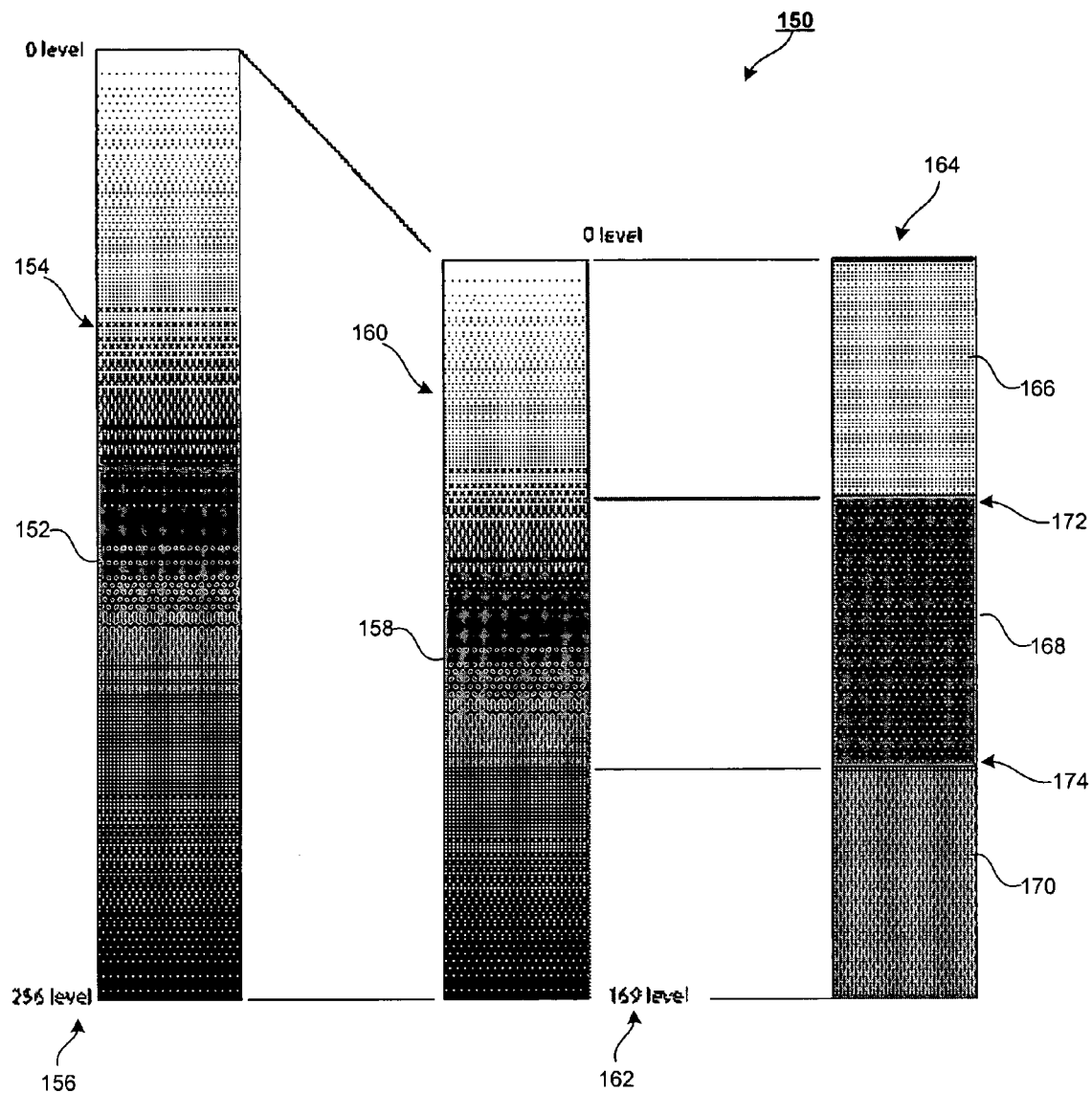
FIG. 1B is an illustration of the mapping of gray levels to screen frequencies of an exemplary embodiment in accordance with the principles of the present invention.

The right-most portion of FIG. 1B illustrates the image data 158 with the lesser number of tonal levels 160 that has been converted to one-bit halftone threshold arrays. The tonal levels resulting from the 256 to 169 tone compression are related to the appropriate array. This results in an image described in one-bit dots, e.g., a halftone. As referenced above with respect to FIG. 1A, a look-up table is suitably implemented for the conversion. The look-up table includes each of the tonal levels 160 and an array containing screen frequency data 164 for each of the lesser number of tonal levels 160. Thus, 169 threshold arrays, each describing a lesser tonal level 160, are present in the look-up table. The arrays 164 describe in a non-formula way the shape and growth of the dots with each cell.

Continuing with the example of FIG. 1B, a first tone area 166 of the arrays 164 describes cells having one halftone frequency per cell, while a second tone area 168 describes cells having three halftone frequencies. Further, a third tone area 170 of the arrays 164 describes cells having two halftone frequencies.

Returning to FIG. 1A, the present invention improves halftone image quality by associating screen frequencies with tone areas that predominately contain three tone ranges, e.g., highlight, mid-tone, and shadow ranges. More specifically, three halftones with different screen frequencies are applied to the tonal data 102 by segmenting the tonal data 102 into three bands, e.g., 110, 112, 114, and associating the three bands 110, 112, and 114, with the three halftone frequencies. The halftone frequencies are selected so that they increase in a continuous manner. Those of ordinary skill in the art will appreciate that the present invention is capable of being advantageously extended to any number of halftone frequencies within a halftone cell.

The three frequencies within each halftone suitably contain round, square and elliptical spot shapes as well as line shapes. The skilled artisan will appreciate that line shapes have been used herein to illustrate the subject invention. As previously mentioned, in other embodiments of the present invention, the three frequencies are suitably delineated by color channels. For example, a yellow channel can consist of three halftone arrays describing three frequencies.

Figure 2:
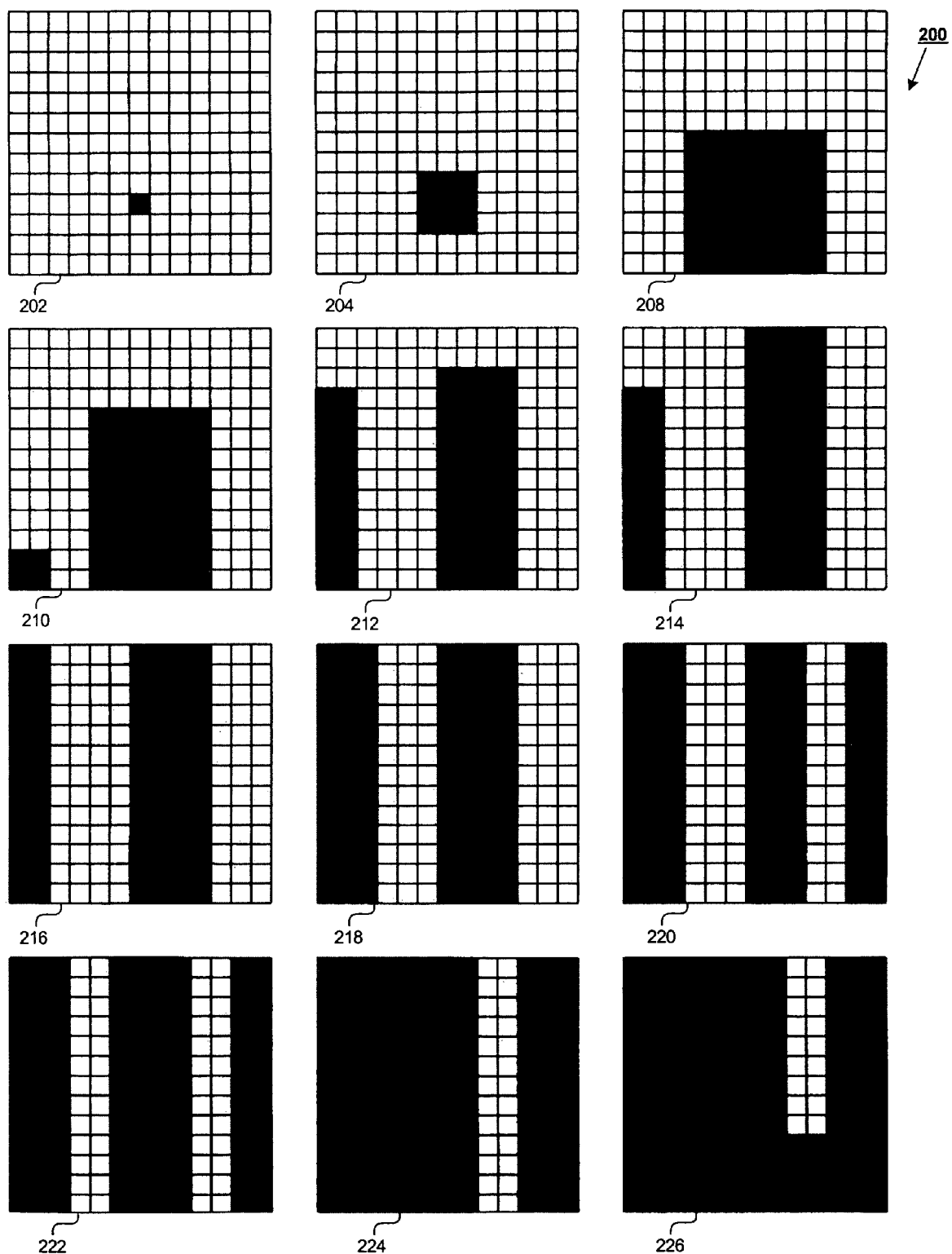
FIG. 2 illustrates the various tonal levels of the halftone screen described by FIG. 1.
Figure 3:
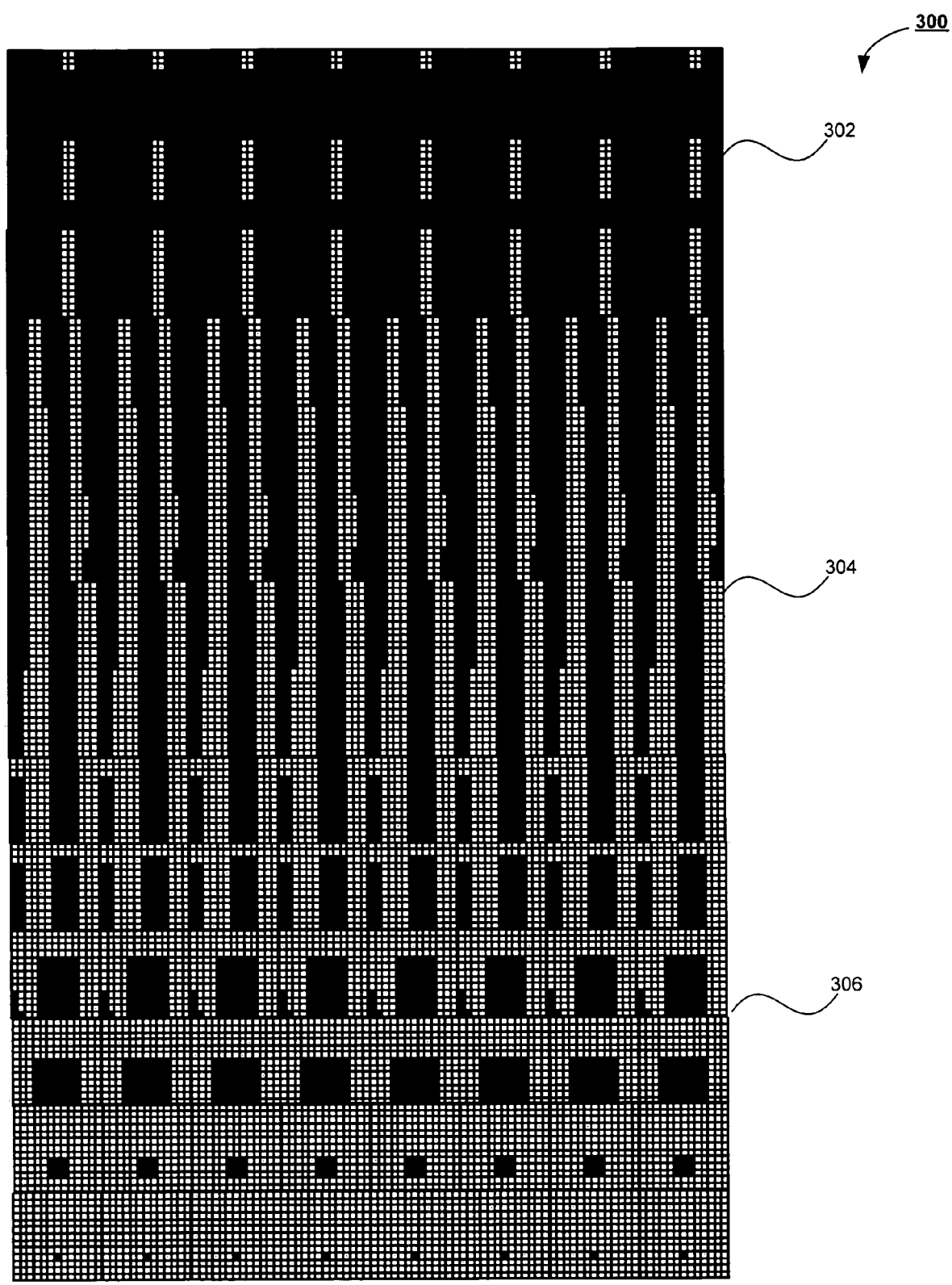
FIG. 3 illustrates the three frequencies of FIG. 2 combined to display a gradient.

Referring to FIGS. 1-3 and returning to the embodiment of the present invention described herein, a 13 by 13 device dot cell with 169 tonal levels and four frequencies, e.g., 46, 92, 138, and 92 lines per inch (lpi) at 600 device dots per inch, is shown. The cells suitably contain any number of device dots, any number of frequencies, and record any number of tonal levels. The cells need not be symmetrical or orthogonal. Since the cells allow flexibility in containing any number of device dots and any number of tonal levels, the characteristic irregular shape and different size defects commonly found in other screens are advantageously eliminated given a high enough device dot resolution.

Referring to FIG. 2, various tonal levels 200 of the halftone screen are shown. More specifically, tonal level 1 is shown at reference numeral 202, tonal level 9 is shown at reference numeral 204, tonal level 49 is shown at reference numeral 208, tonal level 58 is shown at reference numeral 210, tonal level 64 is shown at reference numeral 212, tonal level 72 is shown at reference numeral 214, tonal level 78 is shown at reference numeral 216, tonal level 91 is shown at reference numeral 218, tonal level 104 is shown at reference numeral 220, tonal level 117 is shown at reference numeral 222, tonal level 143 is shown at reference numeral 224, and tonal level 159 is shown at reference numeral 226. Those of ordinary skill in the art will appreciate the extrapolation of those tonal levels intermediate those specifically shown in FIG. 2.

Referring to FIG. 3, the various tonal levels 200 of FIG. 2 combined to display a gradient 300. More specifically, gradient 300 shows a line growth in a 90 degree inclination. Those of ordinary skill in the art will appreciate line growths at other inclinations, such as, for example, 45 degrees. Moreover, those of ordinary skill in the art will appreciate that the present invention is not limited to any particular inclination, but rather includes all possible inclinations. Three halftones 302, 304, and 306, with three frequencies are displayed. Further, when using the present invention, and combined with supercell technology, irrational angles can also be achieved.

Typically, a halftone cell when defined by an array builds density, i.e., increase darkness or tonal level, by adding device dots. In contrast, referring to FIGS. 2 and 3, the embodiment of the present invention illustrated herein describes four arrays in FIG. 2 and three arrays 302, 304, and 306 in FIG. 3 that add device dots, and moves dots to new locations within the cell. Thereby, the dot movement allows for changes in halftone frequencies.

Referring to FIG. 3, a halftone cell is described. Referring once again to FIGS. 1A and 1B, the three bands 110, 112, 114, and 166, 168, 170, respectively, associated with three halftone frequencies may be described in four phases. The first phase describes the dots that define the highlight range of tonal values of a raster image. Further, the first phase is describes simple square cell growth at 46 dots per inch (dpi) and the first tonal levels. The first phase is generally shown in band 110, 166.

The second phase describes a transition phase wherein the screen frequency is changed from 46 lpi to 92 lpi in the next third of the tonal range. Further, the second phase describes the mid-tone range, and is generally indicated by reference numeral 116, 172.

The third phase describes a transition phase wherein the screen frequency is changed from 92 lpi back to 92 lpi in the next third of the tonal range. Further, the third phase describes the mid-tone shadow range and is generally indicated by reference numeral 118, 174.

Figure 4:
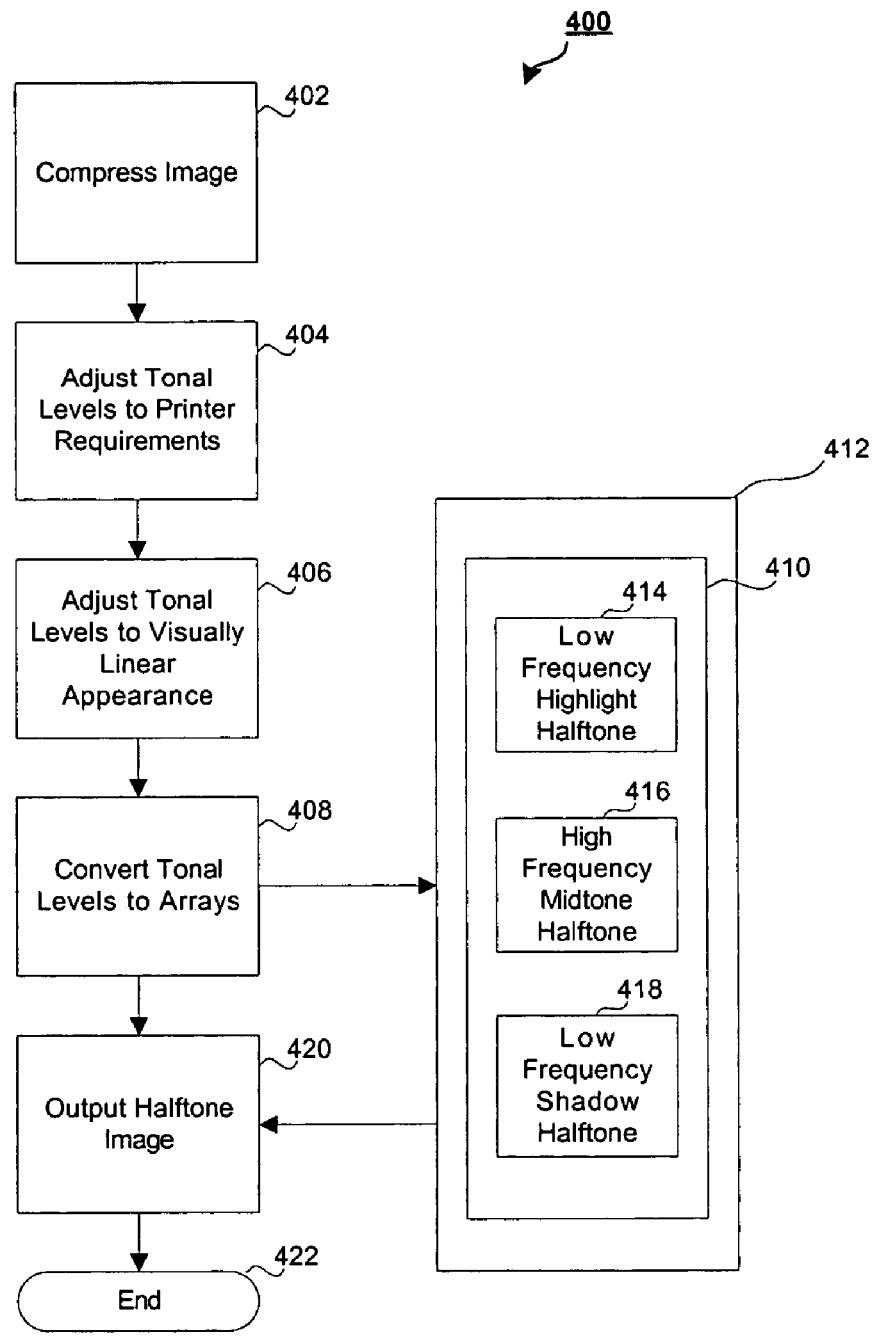
FIG. 4 is a flowchart illustrating the program flow of a screening method following the mapping of FIG. 1.

Turning to FIG. 4, a flowchart illustrating the program flow of a screening method in accordance with principles of the present invention is shown. As will be appreciated by those of ordinary skill in the art, such a program may be executed by a processor such as, for example, a raster image processor (RIP) or a postscript processor commonly implemented in or used in conjunction with printing devices.

The program 400 begins with the source image in step 402. In step 404 wherein an image's tonal levels are adjusted for the requirements the printer. Again, most images are described with a maximum of 256 tonal levels in accordance with the de facto PostScript standard, thus 256 tonal levels are used as an example herein. Those of ordinary skill in the art will appreciate that differing numbers of tonal levels may be used without departing from the spirit of the present invention.

Next, in step 406, the image is adjusted so that the tonal levels are visually linear. As previously described herein, a one-dimensional linearization curve is used to adjust the tonal levels until a visually linear gradient is achieved.

Once the tonal levels are visually linear, the tonal levels are converted to one-bit halftone threshold arrays in step 408. A halftone look-up table 410 comprising 3 threshold arrays 414, 416, and 418, describing a range of tonal levels is stored in memory 412 is accessed and used for the conversion. Any number of halftone arrays describing any number of ranges of gray values may be used.

Once all of the image's tonal levels have been converted, a halftone image is output in step 420. More specifically, the halftone image is described in one-bit dots. The program 400 ends in step 422.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed:

1. A system for halftone screening comprising:
   means adapted to receive image data having a desired number of tonal levels representative of a continuous tone image;
   compression means adapted to compress received image data so as to be defined in M×N tonal levels, wherein M and N are integer values corresponding to a length and width of a halftone cell, and wherein the desired number of tonal levels is greater than M×N;
   linearization means adapted for adjusting the M×N tonal levels so as to be visually linear and formed by two dimensional rectangular foreground dot regions surround by at least one adjacent background level within a plurality of halftone cells at a plurality of lightest tonal levels and formed by linear foreground regions extending linearly between oppositely disposed halftone cells at remaining tonal levels;
   a memory including a look-up table, the look-up table including an array containing halftone data corresponding to tonal levels and uniquely associated screen frequencies and line shapes, wherein device dots are added and moved within each halftone cell in the look-up table, in each of a highlight region, a midtone region, and a shadow region, such that a number of dot centers is altered progressively between the highlight region, the midtone region, and the shadow region, and a position of dots within each region is altered progressively for tonal levels within each region; and
   means adapted for communicating the compressed and linearized image data containing each tonal level to the look-up table having distinct halftone frequencies corresponding to each of the highlight region, midtone region, and shadow region, such that each region outputs corresponding halftone data in accordance with its corresponding halftone frequency.

2. The system of halftone screening of claim 1, wherein the desired number of tonal levels is 256.

3. The system of halftone screening of claim 1, further comprising means adapted to compress the received image data from a desired number of tonal levels to image data having a lesser number of tonal levels, wherein the look-up table includes each of the lesser number of tonal levels, and wherein the look-up table includes an array containing halftone data for each of the lesser number of tonal levels.

4. The system of halftone screening of claim 3, wherein the lesser number of tonal levels is 169 tonal levels.

5. The system of halftone screening of claim 3, wherein every third desired tonal level is eliminated.

6. The system of halftone screening of claim 3, wherein every three desired tonal levels are quantified to two lesser tonal levels.

7. The system of halftone screening of claim 3, further comprising means adapted for adjusting the compressed image data such that the lesser number of tonal levels are visually linear.

8. The system of halftone screening of claim 7, wherein a one-dimensional linearization curve is used to adjust the lesser number of tonal levels until a visually linear gradient is achieved.

9. The system of halftone screening of claim 1, wherein each array containing halftone data for each range of tonal levels is a one-bit array.

10. A method of halftone screening, comprising the steps of:
    receiving image data having a desired number of tonal levels representative of a continuous tone image;
    compressing received image data so as to be defined in M×N tonal levels, wherein M and N are integer values corresponding to a length and width of a halftone cell, and wherein the desired number of tonal levels is greater than M×N;
    adjusting the M×N tonal levels so as to be visually linear and formed by two dimensional rectangular foreground dot regions surround by at least one adjacent background level within a plurality of halftone cells at a purality of lightest tonal levels and formed by linear foreground regions extending linearly between oppositely disposed halftone cells at remaining tonal levels;
    generating a look-up table, wherein the look-up table includes an array containing halftone data corresponding to tonal levels and uniquely associated screen frequencies and line shapes, wherein device dots are added and moved within each halftone cell in the look-up table, in each of a highlight region, a midtone region, and a shadow region, such that a number of dot centers is altered progressively between the highlight region, the midtone region, and the shadow region, and a position of dots within each region is altered progressively for tonal levels within each region; and
    communicating the compressed and linearized image data containing the tonal levels to the look-up table having distinct halftone frequencies corresponding to each of the highlight region, midtone region, and shadow region, such that each region outputs corresponding halftone data in accordance with its corresponding halftone frequency.

11. The method of claim 10, wherein the desired number of tonal levels is 256.

12. The method of claim 10, further comprising the step of compressing the received image data from a desired number of tonal levels to image data having a lesser number of tonal levels, wherein the look-up table includes each of the lesser number of tonal levels, and wherein the look-up table includes an array containing halftone data for each of the lesser number of tonal levels.

13. The method of claim 12, wherein the lesser number of tonal levels is 169 tonal levels.

14. The method of claim 12, wherein every third desired tonal level is eliminated.

15. The method of claim 12, wherein every three desired tonal levels are quantified to two lesser tonal levels.

16. The method of claim 12, further comprising the step of adjusting the compressed image data such that the lesser number of tonal levels are visually linear.

17. The method of claim 16, wherein a one-dimensional linearization curve is used to adjust the lesser number of tonal levels until a visually linear gradient is achieved.

18. The method of claim 10, wherein each array of a halftone for each range of levels is a one-bit array.

* * * * *